March 31, 1936. F. M. PYZEL 2,035,920
PROCESS FOR THE MANUFACTURE OF AMMONIUM SULPHATE
Filed June 24, 1933 3 Sheets-Sheet 1
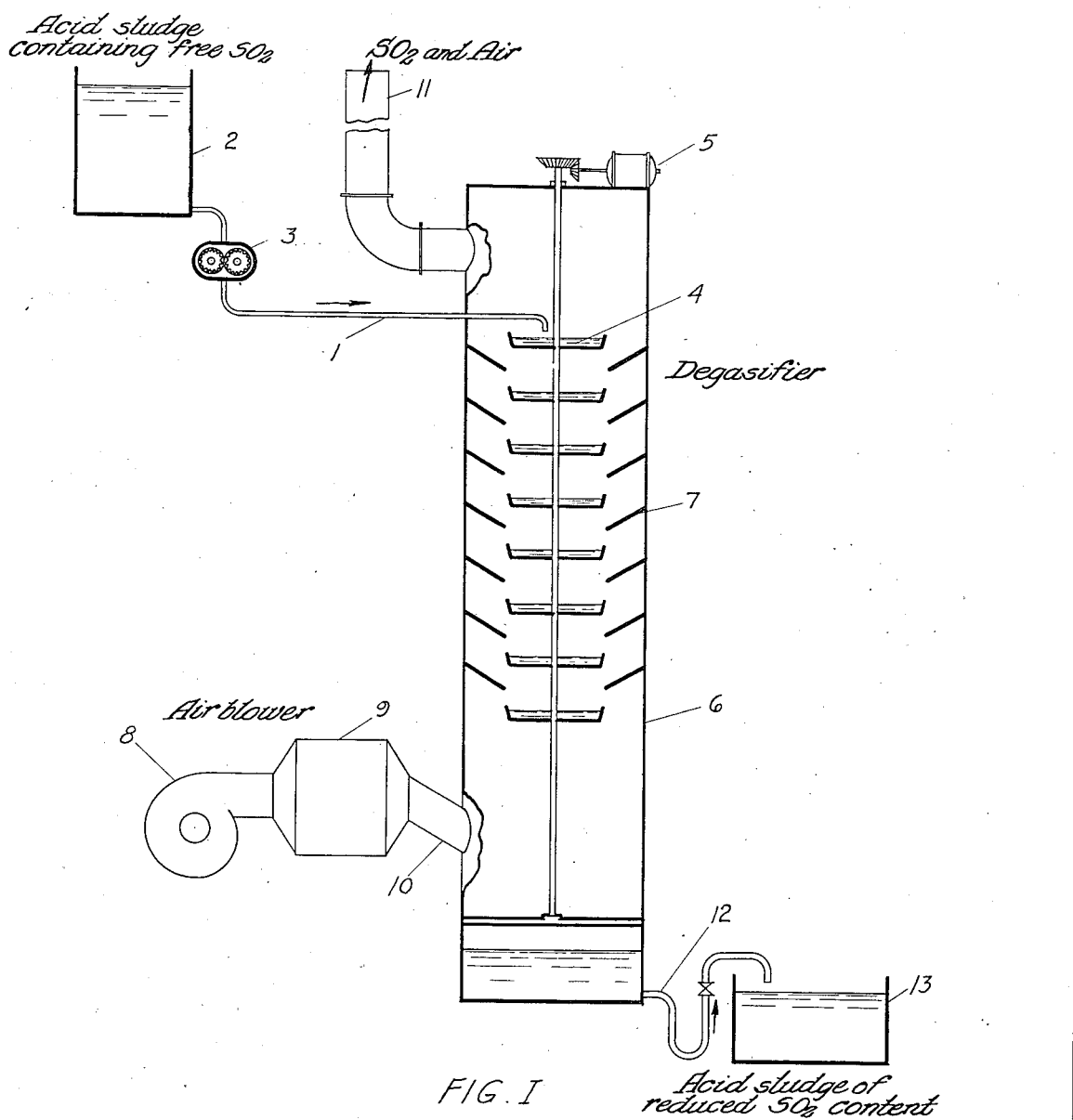
FIG. I

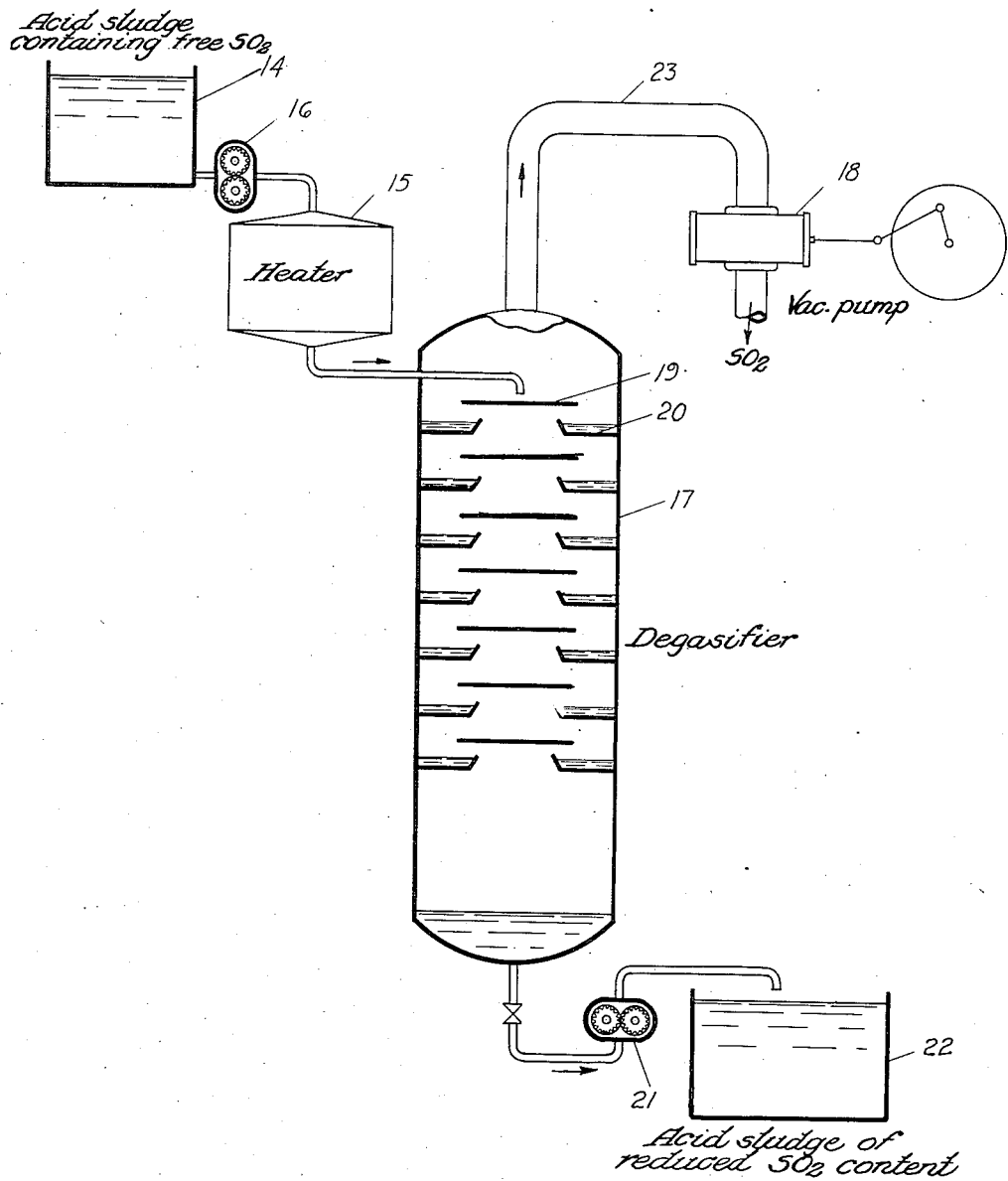
FIG II

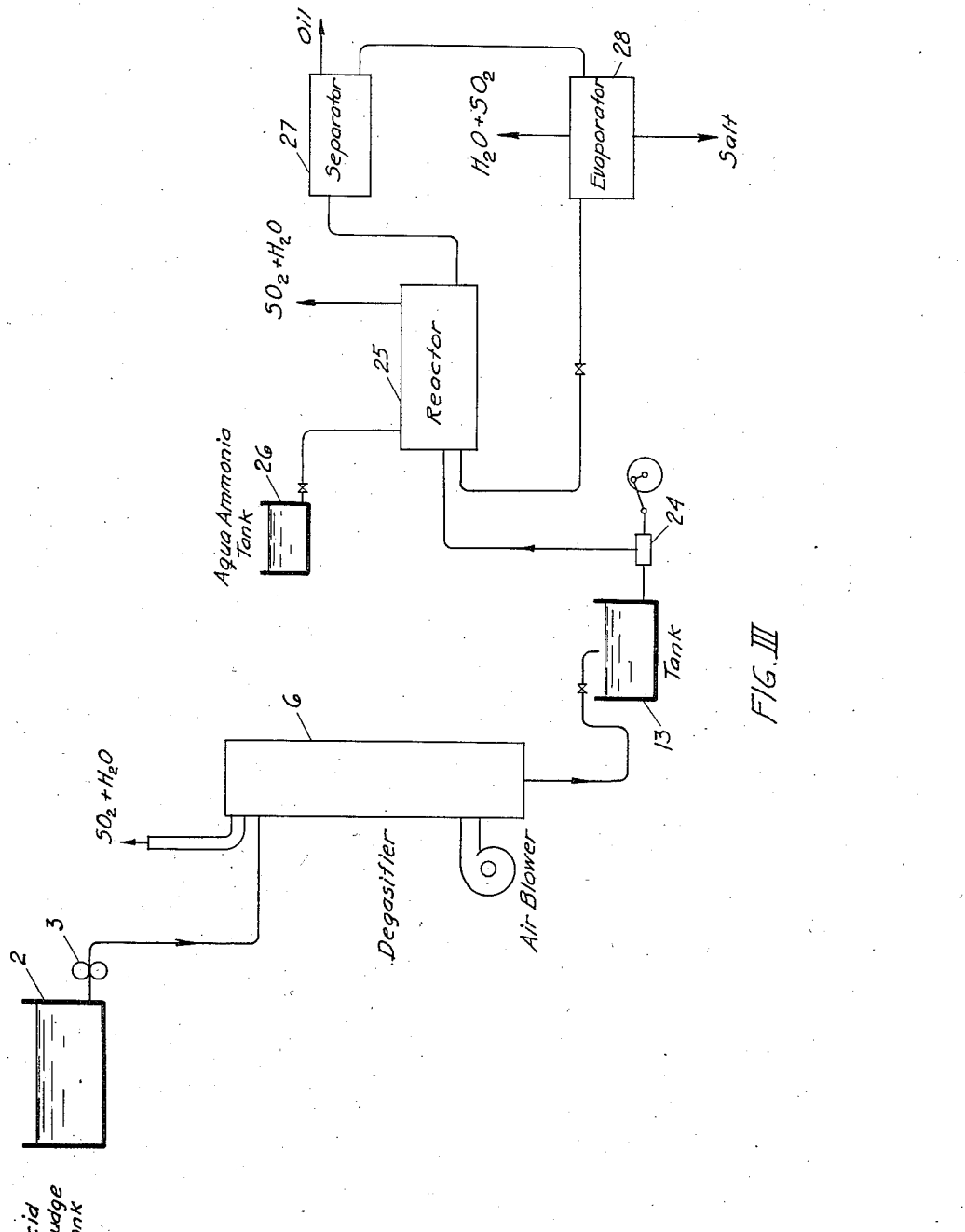

Patented Mar. 31, 1936

2,035,920

UNITED STATES PATENT OFFICE 2,035,920

PROCESS FOR THE MANUFACTURE OF AMMONIUM SULPHATE

Frederic Marinus Pyzel, Piedmont, Calif., assignor to Shell Development Company, San Francisco, Calif., a corporation of Delaware Application June 24, 1933, Serial No. 677,425

5 Claims. (Cl. 23—119)

This invention relates to the manufacture of ammonium sulphate from acid sludge and is particularly concerned with the manufacture of ammonium sulphate from acid sludge containing sulphur dioxide.

When hydrocarbon liquids, for instance petroleum, coal tar or substances derived therefrom are treated with sulphuric acid, sludges are produced which contain considerable quantities of free and combined acid. These are commonly known as acid sludges. Besides sulphuric acid and hydrocarbon material these sludges often contain appreciable amounts of sulphur dioxide.

The manufacture of ammonium sulphate from such appreciable sulphur dioxide containing acid sludges is undesirable in that the ammonium sulphite which is formed decomposes in the evaporation or drying operations to which the salt is subjected resulting in considerable loss of ammonia. Increased corrosion of equipment due to the presence of sulphur dioxide also results. Furthermore, the presence of ammonium sulphite in the ammonium sulphate may be undesirable from a marketing point of view.

Now, I have found that the above disadvantages can be overcome by the following procedure. The acid sludge is prepared before entering the reaction system in which it is reacted with ammonia by subjecting it to a treatment in which the partial pressure of the sulphur dioxide contained in the acid sludge is suitably reduced. During this treatment the temperature and degree of agitation of the acid sludge are maintained within desired limits. The partial pressure of the sulphur dioxide in the gaseous phase contained in the acid sludge during the treatment can be reduced by bringing the acid sludge into intimate contact with a large quantity of air or other gas, or by subjecting the acid sludge to a vacuum by removing the gases and vapors in contact with the acid sludge by suitable means. In general, the maximum temperature to which the acid sludge is heated should not exceed 70° C., although the temperature to which a particular acid sludge may be heated depends upon its composition. The maximum temperature to which the acid sludge is subjected during the treatment should be strictly limited so that decomposition within the acid sludge is not accelerated. Overheating results in decomposition producing additional amounts of sulphur dioxide presumably by oxidation of the organic matter in the sludge by the sulphuric acid which decreases the effective sulphuric acid content. Other bad effects which arise through overheating are decreased fluidity due to formation of gummy material and an increased tendency to foaming during the subsequent reaction with the ammonia.

Apparatus suitable for carrying out the process is shown diagrammatically in the accompanying drawings.

Figure I of the drawings illustrates by way of example an elevation partly in section of apparatus for carrying out the sulphur dioxide removal by aeration.

Figure II of the drawings illustrates by way of example an elevation partly in section of apparatus by which the sulphur dioxide is removed by mechanically reducing the partial pressure of sulphur dioxide in the acid sludge.

Figure III is a flow sheet of apparatus for the manufacturing of ammonium sulphate.

Referring to Figure I, acid sludge is conducted through pipe (1) from tank (2) by means of pump (3) into the top of a series of plates (4) rotated by a motor (5) situated on the top of the degasifier (6). Attached to the inside wall of the degasifier are annular baffles (7) the plane of which slopes downward towards the centre of the apparatus (6). Air is forced by blower (8) over a heating element (9) into conduit (10). The heated air is discharged into the bottom portion of the apparatus (6) and upon rising contacts with the acid sludge being sprayed by rotation of the plates (4). The baffles (7) serve to return the acid back to the rotating plates and to improve sludge-air contact. By the contact with the warm air the sulphur dioxide in the sludge is released and together with the air is led off through chimney (11). The treated sludge is withdrawn through pipe (12) to a tank (13).

In operating according to Figure II, acid sludge is forced from tank (14) to the top of a degasifier (17) by means of a pump (16). The degasifier (17) is maintained under vacuum by means of a pump (18). Before passing into the degasifier the sludge may be passed through a heater (15). The sludge trickles down over plates (19) and annular trays (20) arranged in the degasifier so as to increase the exposed surface of the acid sludge undergoing treatment. Due to the heating of the sludge and the reduced pressure the sulphur dioxide is liberated. The treated sludge collects in the bottom of the degasifier and is withdrawn by pump (21) and conducted to a storage tank (22) and thence to the reaction system. The sulphur dioxide together with other evolved vapors is withdrawn through pipe (23) by the vacuum pump (18). In place of the degasifiers of the types shown other apparatus may be used such as for instance, a tank or group of tanks connected in series, each tank being provided with an agitator and suitable nozzles for admitting the acid sludge to be treated, and pipes for removing the treated sludge and for carrying off the gases and vapors evolved. An agitator serves a dual purpose in that it both mechanically assists in the evolution of the contained gases and provides a method of maintaining the temperature of the acid sludge in that it can supply sufficient heat to compensate for the heat utilized in vaporizing the dissolved gases and vapors.

The following examples will further illustrate the nature of this invention but it is not restricted thereto.

Example I

An acid sludge containing 2.9% by weight of sulphur dioxide and having a sulphuric acid content of 41.5% was fed into the degasifier shown in Figure I at the rate of .33 gallons per minute. Air was passed into the degasifier from conduit (10) at a temperature of approximately 52° C. and at the rate of 150 cu. ft. per minute. The sulphur dioxide content of the sludge withdrawn from the degasifier was 0.39% by weight.

Example II 950 cc. of acid sludge containing 4.52% sulphur dioxide by weight was run at a temperature of 30° C. into a vessel provided with an agitator and a vacuum applied. After 30 minutes the vacuum attained was 26″ mercury and the sulphur dioxide content of the acid sludge was reduced to 0.39% by weight.

The $SO_2$ content should in general be reduced to approximately 2% by weight of the sulphuric acid content of the sludge.

With the sulphur dioxide content reduced to such percentage a satisfactory ammonium sulphate can be produced. The acid sludge can be reacted with ammonia in a suitable vessel in the presence of a large excess of approximately saturated ammonium sulphate solution. The reactants are introduced into a reaction vessel in such proportions that the acidity of the resulting solution comprises acidity due to sulphuric acid as well as acidity due to the presence of sulphurous acid and organic acids. A sufficiently high temperature of reaction will under these conditions expel most of the sulphur dioxide left in the acid sludge. Any sulphur dioxide remaining in the ammonium sulphate solution formed will be practically eliminated during the evaporation process by which the volume of the solution is reduced to produce solid ammonium sulphate.

Figure III shows a diagrammatic flow sheet of a system for the continuous manufacture of the ammonium sulphate from acid sludge using the aerating degasifier for the removal of the sulphur dioxide. According to this particular arrangement the acid sludge in storage in tank (2) is withdrawn and forced into the degasifier unit (6) by pump (3). The acid sludge with sulphur dioxide content suitably reduced is run from the degasifier into a feed tank (13) from which it is pumped by a suitable pump (24) into the reaction apparatus (25). Aqua ammonia is supplied to the reaction apparatus from a tank (26).

The ammonia reacts with the acid sludge forming a liquid comprising acid ammonium sulphate solution and oily material. The oily material can be separated from the ammonium sulphate solution by appropriate means, for example by mechanical separation or extraction. Numeral (27) designates generally separator apparatus for removing the oily material. In practice I have found that the major part of the oily material can be skimmed off the top of the ammonium sulphate solution. The oily material then remaining admixed with the ammonium sulphate solution can be removed by filtering or centrifuging. The ammonium sulphate solution after oil removal, is fed into an evaporator apparatus (28). The salt which crystallizes out as a result of the evaporation of water is withdrawn and subsequently dried. The mother liquor can be returned to the reaction system. Besides water vapor, the sulphur dioxide remaining in the ammonium sulphate solution fed into the evaporator will be released in the evaporator.

I claim as my invention:

1. Process for the manufacture of ammonium sulphate from a sulphur dioxide containing acid sludge comprising reducing the free sulphur dioxide content of the acid sludge to approximately 2% by weight of the sulphuric acid content of the acid sludge, thereafter neutralizing said sulphuric acid with ammonia to the point at which sufficient heat is generated to expel most of the free sulphur dioxide remaining in the acid sludge.

2. Process for the manufacture of ammonium sulphate from a sulphur dioxide containing acid sludge comprising aerating the acid sludge whereby the free sulphur dioxide content of the acid sludge is reduced to approximately 2% by weight of the sulphuric acid content of the acid sludge and thereafter reacting the resulting acid sludge with sufficient ammonia to such a point so as to produce ammonium sulphate and cause the expulsion of most of the remaining amounts of free sulphur dioxide.

3. Process for the manufacture of ammonium sulphate from a sulphur dioxide containing acid sludge comprising reducing the free sulphur dioxide content of the acid sludge to less than 2% by weight of the sulphuric acid content of the acid sludge and thereafter reacting the resulting acid sludge with sufficient ammonia whereby ammonium sulphate is produced and most of the remaining amounts of free sulphur dioxide expelled.

4. Process for the manufacture of ammonium sulphate from a sulphur dioxide containing acid sludge comprising reducing the free sulphur dioxide content of the acid sludge to approximately 2% by weight of the sulphuric acid content of the acid sludge, thereafter reacting the resulting acid sludge with sufficient ammonia to the point at which enough heat is generated to expel most of the free sulphur dioxide left in the acid sludge.

5. Process for the manufacture of ammonium sulphate from a sulphur dioxide containing acid sludge comprising reducing the free sulphur dioxide content of the acid sludge to approximately 2% by weight of the sulphuric acid content of the acid sludge, thereafter neutralizing said sulphuric acid with ammonia to the point at which, sufficient heat being generated, most of the free sulphur dioxide remaining in the acid sludge is expelled.

FREDERIC M. PYZEL.